United States Patent
Kluy

(10) Patent No.: US 12,512,494 B2
(45) Date of Patent: Dec. 30, 2025

(54) VOLTAGE CONVERTER ARRANGEMENT, FUEL CELL SYSTEM AND METHOD OF OPERATING A VOLTAGE CONVERTER ARRANGEMENT

(71) Applicant: AUDI AG, Ingolstadt (DE)

(72) Inventor: Norbert Kluy, Schernfeld (DE)

(73) Assignee: AUDI AG, Ingolstadt (DE)

( * ) Notice: Subject to any disclaimer, the term of this patent is extended or adjusted under 35 U.S.C. 154(b) by 796 days.

(21) Appl. No.: 17/423,831

(22) PCT Filed: Nov. 4, 2019

(86) PCT No.: PCT/EP2019/080048
§ 371 (c)(1),
(2) Date: Jul. 16, 2021

(87) PCT Pub. No.: WO2020/147991
PCT Pub. Date: Jul. 23, 2020

(65) Prior Publication Data
US 2022/0077479 A1    Mar. 10, 2022

(30) Foreign Application Priority Data
Jan. 17, 2019    (DE) ............ 10 2019 200 586.1

(51) Int. Cl.
*H01M 8/04537*    (2016.01)
*B60L 50/75*    (2019.01)
(Continued)

(52) U.S. Cl.
CPC ......... *H01M 8/04649* (2013.01); *B60L 50/75* (2019.02); *B60L 58/40* (2019.02);
(Continued)

(58) Field of Classification Search
CPC ......... H01M 8/04649; H01M 8/04544; H01M 2250/20; B60L 50/75; B60L 58/40;
(Continued)

(56) References Cited

U.S. PATENT DOCUMENTS

| | | | |
|---|---|---|---|
| 8,268,495 | B2 | 9/2012 | Manabe et al. |
| 9,461,320 | B2 | 10/2016 | Ballantine et al. |

(Continued)

FOREIGN PATENT DOCUMENTS

| | | |
|---|---|---|
| DE | 112006001720 T5 | 9/2008 |
| JP | 2011-222134 A | 11/2011 |

(Continued)

OTHER PUBLICATIONS

International Search Report, mailed Feb. 6, 2020, for International Application No. PCT/EP2019/080048, 4 pages.
(Continued)

*Primary Examiner* — Adam J Francis
(74) *Attorney, Agent, or Firm* — Seed Intellectual Property Law Group LLP

(57) ABSTRACT

A voltage converter arrangement for the electrical coupling of a fuel cell unit is provided, which is connected or can be connected on the input side, to a traction network, which is connected or can be connected on the output side, and which comprises a high-voltage battery may comprise a measuring unit for measuring the input voltage supplied by the fuel cell unit, and a comparison unit, which is electrically connected to the measuring unit and is in turn electrically coupled to a controller unit, which is designed to cause the fuel cell unit to be operated at predeterminable operating points, and which is configured to seek time-varying operating points from the fuel cell unit in an impedance operation. A fuel cell system and a method for operating a voltage converter arrangement is also provided.

6 Claims, 2 Drawing Sheets

(51) Int. Cl.
  *B60L 58/40* (2019.01)
  *H02J 3/32* (2006.01)
  *H02J 7/34* (2006.01)
(52) U.S. Cl.
  CPC .......... *H01M 8/04544* (2013.01); *H02J 3/32* (2013.01); *H02J 7/34* (2013.01); *H01M 2250/20* (2013.01)
(58) Field of Classification Search
  CPC .... H02J 3/32; H02J 7/34; H02J 7/0047; H02J 2300/30; Y02T 10/70; Y02T 90/40; Y02E 60/50
  See application file for complete search history.

(56) References Cited

U.S. PATENT DOCUMENTS

| | | | | |
|---|---|---|---|---|
| 2005/0249989 | A1* | 11/2005 | Pearson | H01M 8/0491 429/432 |
| 2008/0188799 | A1* | 8/2008 | Mueller-Beckhaus | A61M 5/3134 604/227 |
| 2009/0269622 | A1* | 10/2009 | Aso | H01M 8/04753 429/429 |
| 2012/0326668 | A1* | 12/2012 | Ballatine | B60L 53/20 320/109 |
| 2014/0295302 | A1* | 10/2014 | Ishikawa | H01M 8/04388 702/65 |
| 2017/0045588 | A1* | 2/2017 | Aoki | H01M 8/04992 |
| 2018/0034076 | A1 | 2/2018 | Hasegawa et al. | |
| 2018/0123152 | A1* | 5/2018 | Matsumoto | H01M 8/04223 |
| 2022/0223937 | A1* | 7/2022 | Xu | B60L 50/60 |

FOREIGN PATENT DOCUMENTS

| | | |
|---|---|---|
| WO | 2016/146971 A1 | 9/2016 |
| WO | 2017/221421 A1 | 12/2017 |

OTHER PUBLICATIONS

International Preliminary Report on Patentability, mailed Jul. 19, 2021, for International Application No. PCT/EP2019/080048, 7 pages.

* cited by examiner

VOLTAGE CONVERTER ARRANGEMENT, FUEL CELL SYSTEM AND METHOD OF OPERATING A VOLTAGE CONVERTER ARRANGEMENT

BACKGROUND

Technical Field

Embodiments of the invention relate to a voltage converter arrangement for the electrical coupling of a fuel cell unit, which is connected or can be connected on the input side, to a traction network, which is connected or can be connected on the output side and which comprises a high-voltage battery, to a measuring unit for measuring the input voltage supplied by the fuel cell unit, and to a comparison unit, which is electrically connected to the measuring unit and is in turn electrically coupled to a controller unit, which is designed to cause the fuel cell unit to be operated at predeterminable operating points. Embodiments of the invention also relate to a fuel cell system and a method for operating a voltage converter arrangement.

Description of the Related Art

It is known and, for example, described in U.S. Pat. No. 9,461,320 B2 that electrochemical cells, in particular fuel cell units, can be subjected to electrochemical impedance spectroscopy. The state, in particular the state of aging due to the effects of degradation of the fuel cell unit can be determined by means of such an impedance spectroscopy, whereby an alternating voltage is applied to the electrodes of the fuel cell unit in order to query a current and/or voltage response. This response then allows conclusions to be drawn about the state of the fuel cell unit. This is, for example, also described in WO 2016/146 971 A1.

Impedance measurements are a widely used method in research and application to perform non-destructive measurements during the operation of fuel cells. For measurements on a fuel cell, the impedance meter is connected to both electrodes of the fuel cell. The measuring device imprints a typically sinusoidal AC voltage in the measurement.

In so doing, the use of a separate measuring device or a separate measuring circuit is necessary to perform the impedance spectroscopy or the impedance measurement, which leads to a complex setup of the fuel cell system in which such an impedance spectroscopy or impedance measurement is to be performed.

BRIEF SUMMARY

Embodiments provide a voltage converter arrangement, a fuel cell system and a method for operating a voltage converter arrangement which reduce or avoid the above-mentioned disadvantages.

The voltage converter arrangement is, in particular, characterized by the fact that its controller unit is designed to seek out time-varying operating points from the fuel cell unit in impedance operation. These operating points may be sought out periodically alternating, such as sinusoidal alternating, by the fuel cell unit.

The advantage of this design is that the already existing hardware of the converter, which usually consists of a DC-to-DC converter, can be used for the impedance measurement. This eliminates the need for a separate measuring device, which reduces the complexity of the overall system.

At the same time, the required installation space and the weight of a fuel cell system using the voltage converter arrangement are also reduced.

It has proven to be advantageous if the controller unit is designed to specify a resultant AC voltage or a resultant AC current as a reference variable, if the measuring unit is designed to detect a current and/or voltage response of the fuel cell unit applied to a pair of connectors on the input side to the induced time-varying or alternating operating points, and if the comparison unit is designed to compare the measured current and/or voltage response with the reference variable. It is possible to accordingly adjust the reference variable by this comparison.

The reference variable specified by the controller unit is composed of the superposition of a DC voltage component, which is "averaged" by the fuel cell unit during impedance operation, and a periodic voltage signal generated by querying different load points. The superposition of DC and AC voltage signals then forms the oscillating reference variable of the controller unit, which produces the same effect as a hardware setting of an AC voltage; e.g., by means of a separate or dedicated impedance spectroscopy device.

It has been shown to be advantageous if an output voltage formed as a DC voltage can also be output on the battery side during impedance operation. In so doing, it is ensured that there is only a DC voltage on the output side of the voltage converter arrangement during impedance operation, so that any eventual drive unit or any consumer can still be provided with this DC voltage; even if the fuel cell unit is being examined.

It is hereby advantageous if the voltage converter arrangement is adapted to the power class of the fuel cell unit. Power ratings of 100 kilowatts (kW) to 180 kW, such as about 140 KW, can be used. When performing the impedance measurement, it should be ensured that no power is requested from the fuel cell unit that is either too high or too low, since the operating points to be selected may lie in the linear range of the characteristic U/I curve that is typical for fuel cell units. In this context, it has therefore proven to be advantageous if the alternating operating points are selected around a predeterminable or predetermined reference operating point, which substantially corresponds to a reference voltage UR and/or a reference current strength IR.

In order not to seek out operating points outside the linear range of the characteristic U/I curve of the fuel cell unit, it has been found to be advantageous if the alternating operating points do not deviate from the reference operating point by more than ten percent, such as by not more than five percent.

The voltage converter arrangement displays its advantages when used in a fuel cell system comprising a fuel cell unit which is electrically connected to a traction network comprising a high-voltage battery by means of the voltage converter arrangement. The advantages and embodiments mentioned for the voltage converter arrangement also apply to the fuel cell system described herein.

Some embodiments include a method for operating a voltage converter arrangement which electrically couples a fuel cell unit connected on the input side, with a traction network comprising a high-voltage battery and which network is connected on the output side. The voltage converter arrangement comprises a measuring unit which is designed to measure the input voltage supplied by the fuel cell unit. In addition, there is a comparison unit electrically connected to the measurement unit, which in turn is electrically coupled to a controller unit that arranges for the fuel cell unit to be operated at predetermined operating points. In particular, the method comprises the step of seeking out time-varying, especially periodically alternating, such as sinusoidal alternating, operating points from the fuel cell unit.

By means of this method, the voltage converter arrangement is thus switched into impedance operation or in impedance spectroscopy operation, in which a "virtual" AC voltage is applied to the fuel cell unit. This is used for the impedance measurement. At the same time, impedance spectroscopy is possible when different wavelengths and/or amplitudes for the sinusoidal AC voltage are passed through at the fuel cell unit and the respective current and/or voltage responses are recorded.

When using this method, there is likewise the advantage that a separate or additional measuring device can be dispensed with in order to carry out an impedance measurement on the fuel cell unit.

In some embodiments, the controller unit provides a resulting AC voltage as a reference variable, wherein the measuring unit detects or acquires a current and/or a voltage response of the fuel cell unit applied to a pair of connectors on the input side to the induced time-varying operating points. The comparison unit compares the measured current and/or voltage response with the reference variable specified by the controller unit, so that the controller unit can readjust the reference variable if necessary to obtain a desired response signal from the fuel cell unit.

It has proven to be useful if a DC voltage is output on the battery side of the voltage converter arrangement during impedance operation, so that consumers can continue to be supplied with this DC voltage, even if an impedance measurement is currently being performed on the fuel cell unit.

In order to carry out the impedance measurement with particular operational reliability, it has proven to be advantageous if the alternating operating points are selected around a predeterminable or predetermined reference operating point. In this context, it is useful if the alternating operating points do not deviate from the reference operating point by more than ten percent, such as not more than five percent.

The features and combinations of features mentioned above in the description, as well as the features and combinations of features mentioned below in the drawing descriptions and/or shown alone in the figures, can be used not only in the combination indicated in each case, but also in other combinations or on their own, without leaving the scope of the present disclosure. Thus, embodiments are also to be regarded as encompassed and disclosed which are not explicitly shown or explained in the figures, but which arise from the explained embodiments and can be generated by separate combinations of features.

BRIEF DESCRIPTION OF THE SEVERAL VIEWS OF THE DRAWINGS

Further advantages, features and details will be apparent from the claims, from the following detailed description and from the drawings.

DETAILED DESCRIPTION

Figure 1:
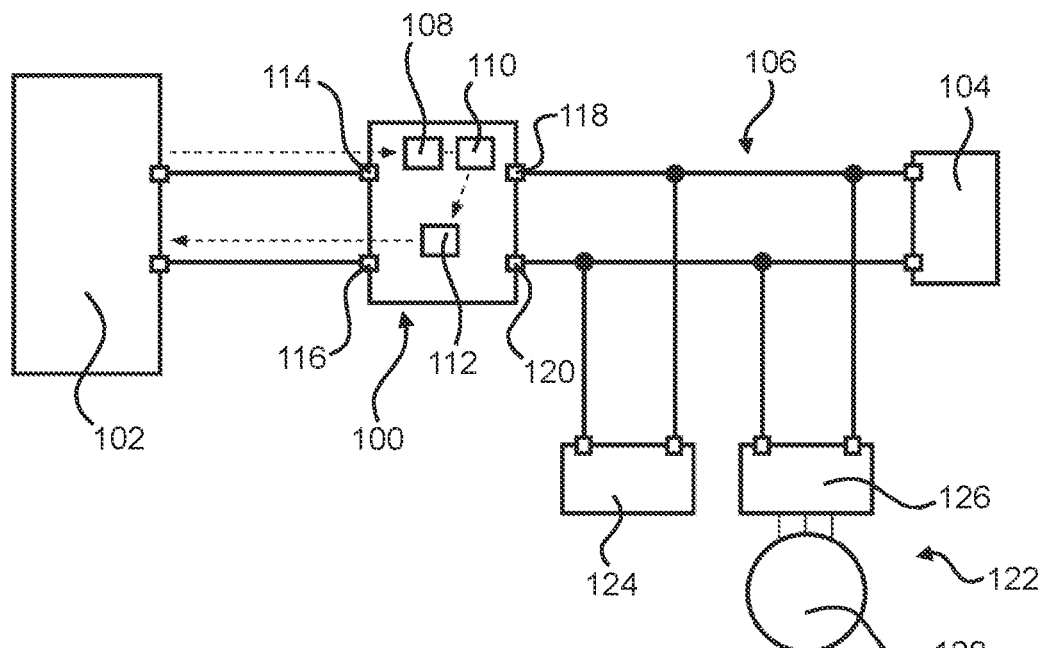
FIG. 1 shows a schematic representation of a fuel cell system with a voltage converter arrangement which electrically connects the fuel cell unit to a traction network comprising a battery, to which two consumers are connected.

FIG. 1 shows a schematic representation of a fuel cell system comprising a fuel cell unit 102. This fuel cell unit 102 is connected to connectors 114, 116 of a pair of connectors on the input side of a voltage converter arrangement 100, which is designed, for example, as a modified DC-to-DC converter. The voltage converter arrangement 100 is electrically connected with its two connectors 118, 120, i.e., with its pair of connectors on the output side, to a traction network 106 (on-board network) in which a high-voltage battery 104 is present. This on-board network is used to supply electrical energy to a first consumer 122 and to a second consumer 124. The traction network 106 can also supply electrical energy to other consumers which are not shown in more detail.

The consumer 122 comprises a drive unit 128, which is in the form of an electric machine. This electric machine is typically operable by means of a three-phase alternating current and may be formed as a traction motor for a motor vehicle. Since a high DC voltage and a DC current are present in the traction network 106, an inverter 126 is additionally associated with the consumer 122, which converts the DC current into a three-phase AC current. In a further embodiment of the consumer 122, the drive unit 128 can also be used as a generator so that, for example, energy generated by the drive unit 128 during the braking process can once again be fed back to the high-voltage battery 104 via the inverter 126.

The second consumer 124 may also be connected to the traction network, wherein this network may be formed, for example, as one of the auxiliary units of the fuel cell system, such as a compressor, a recirculation fan, a jet pump or the like. It is also possible that the consumer 124 is formed as a charger, a twelve-volt DC-to-DC converter, a high-voltage heater, an electric air-conditioning compressor, or the like.

The construction of the voltage converter arrangement 100 is discussed in more detail below. The voltage converter arrangement 100 includes a measuring unit 108 that measures or records the input voltage supplied by the fuel cell unit 102, as illustrated by the dashed arrow. The measuring unit 108 is electrically connected to a comparison unit 110, which in turn is electrically coupled to a controller unit 112. The controller unit 112 is adapted to cause the fuel cell unit 102 to be driven at predeterminable operating points 200, 202, as illustrated by the dashed arrow, in the direction of the fuel cell unit 102.

In order to be able to perform an impedance measurement on the fuel cell unit 102, the controller unit 112 is designed in impedance operation to seek out in a time-varying or periodically alternating manner operating points 200, 202 from the fuel cell unit 102. This corresponds in essence to a time-varying or periodically alternating load demand from the fuel cell unit 102. The alternation between the operating points 200, 202 may be sinusoidal.

Figure 2:
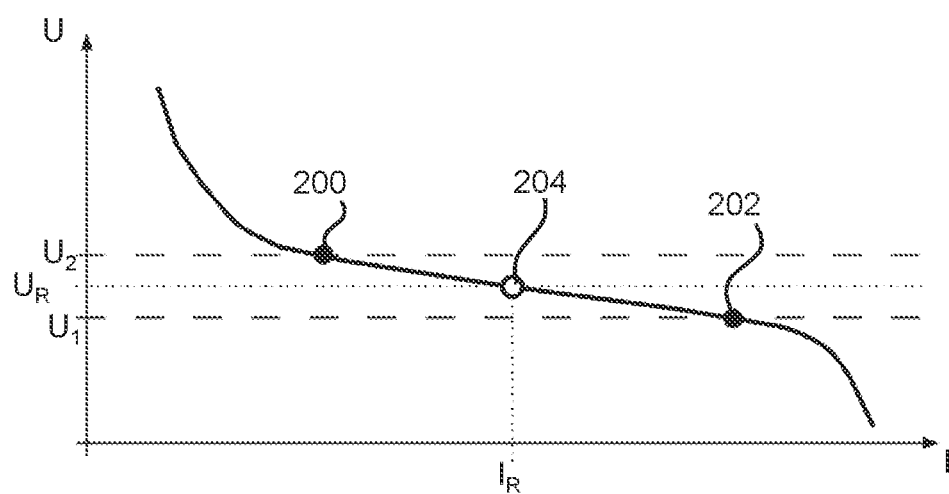
FIG. 2 shows a characteristic U/I curve of a fuel cell unit, on which two operating points and an intermediate reference operating point are highlighted.

FIG. 2 shows a typical characteristic U/I curve of a fuel cell unit 102, wherein an operating point 200 with a low load demand and an operating point 202 with a high load demand have been marked on the characteristic U/I curve. The two operating points 200, 202 are located in the linear range of the characteristic curve of the fuel cell unit 102. The controller unit 112 may be designed to query different load requirements in impedance or impedance spectroscopy operation of the voltage converter arrangement 100, which load demands lie in the range starting from the operating point 200 with a low load demand up to the operating point 202 with a high load requirement.

In so doing, the operating points lying in this range are continuously or on a step-by-step basis "specified" or "run through" by controller unit 112. This querying of the individual operating points takes place periodically in ascending and descending order, in particular between the operating point 200 and the operating point 202; in particular including these two operating points.

It should be recognized that at operating point 202 there is a low voltage $U_1$, and that at operating point 200 there is a voltage $U_2$ that is higher than $U_1$. When the operating points between the operating point 200 and the operating point 202 are continuously or incrementally cycled through, all voltages that lie between the two voltages $U_2$ and $U_1$ are sought out or supplied by the fuel cell unit 102.

It is, however, alternatively also possible to directly switch or "jump" between the two operating points 200, 202 or alternatively directly between the two voltages $U_1$, $U_2$ during the demand, since in some cases the "sluggishness" of the fuel cell unit 102 in response to the demand itself leads to a temporally undulating or sinusoidal voltage curve.

Figure 3:
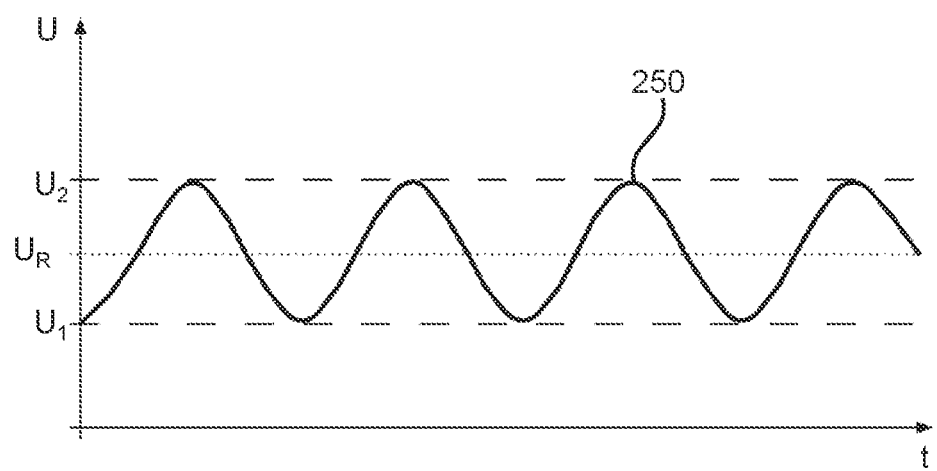
FIG. 3 shows a voltage curve, over time, of the input voltage supplied by the fuel cell unit in impedance or impedance spectroscopy operation.

If the controller unit 112 now causes a periodic switch or "running alongside" of the linear range between the operating points 200, 202, the result is the voltage U shown in FIG. 3, in particular a sinusoidal voltage, plotted over time t. The voltage signal generated by the controller unit 112 is then an AC voltage 250, which is composed of a DC voltage component, in this case a voltage corresponding to a reference operating point 204, and a sinusoidal voltage component. This mode of operation results in an AC voltage 250 being notionally present at the fuel cell unit 102, even without an external measuring device or without external circuit arrangements, which voltage is used for the impedance measurement or for the impedance spectroscopy.

The controller unit 112 may be designed to specify the resulting AC voltage 250 as a reference variable, wherein the measuring unit 108 is designed to detect a current and/or a voltage response of the fuel cell unit 102 which response is applied to the pair of connectors on the input side to the time-varying operating points 200, 202 induced by the controller unit 112, wherein the comparison unit 110 is designed to compare the measured current and/or voltage response with the reference variable. If necessary, the reference variable is accordingly adjusted so that the current and/or voltage response corresponds to a desired value or to a desired curve.

During impedance measurement, it has proven to be advantageous if the alternating operating points 200, 202 do not deviate from the reference operating point 204 by more than ten percent, such as not more than five percent. This ensures that the operating points 200, 202 around the reference operating point 204 still lie within the linear range of the characteristic U/I curve of the fuel cell unit 102.

As a result, an impedance measurement is also possible without the use of external measuring devices, wherein the hardware that is in any case already available can be used for the measurement. This reduces costs and leads to a more compact and simplified design of the fuel cell system or of a motor vehicle which uses this fuel cell system.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A voltage converter arrangement for electrical coupling of a fuel cell unit that is connected or can be connected on an input side of the voltage converter arrangement to a traction network that includes a battery and that is connected or can be connected on an output side of the voltage converter arrangement, the voltage converter arrangement comprising:
   a first pair of connectors on the input side of the voltage converter arrangement;
   a second pair of connectors on the output side of the voltage converter arrangement; and
   a controller coupled between the first pair of connectors on the input side of the voltage converter arrangement and the second pair of connectors on the output side of the voltage converter arrangement,
   wherein the controller, in operation, causes the fuel cell unit to be operated at a plurality of operating points including at least a first operating point and a second operating point by communicating with the fuel cell unit via at least one of the first pair of connectors on the input side of the voltage converter arrangement,
   wherein the controller, in operation, specifies a resultant alternating current (AC) voltage as a reference variable,
   wherein the resultant AC voltage varies over time between a first voltage corresponding to the first operating point and a second voltage corresponding to the second operating point,
   wherein the first operating point and the second operating point are selected around a reference operating point corresponding to a third voltage,
   wherein the first voltage, the second voltage, and the third voltage lie within a linear range of a characteristic voltage versus current curve of the fuel cell unit,
   wherein the controller, in operation, adjusts the reference variable based on a comparison of the reference variable and a voltage supplied by the fuel cell unit via at least one of the first pair of connectors on the input side of the voltage converter arrangement,
   wherein the controller, in operation, performs an impedance operation while causing the fuel cell unit to be operated at the operating points, and
   wherein, during the impedance operation, at least one of the second pair of connectors on the output side of the voltage converter arrangement outputs a direct current (DC) voltage.

2. A fuel cell system, comprising:
   a fuel cell unit;
   a traction network in which a battery is present; and
   a voltage converter arrangement for electrical coupling of the fuel cell unit that is connected or can be connected on an input side of the voltage converter arrangement to the traction network that is connected or can be connected on an output side of the voltage converter arrangement,
   wherein the voltage converter arrangement includes:
      a first pair of connectors on the input side of the voltage converter arrangement;
      a second pair of connectors on the output side of the voltage converter arrangement; and
      a controller coupled between the first pair of connectors on the input side of the voltage converter arrangement and the second pair of connectors on the output side of the voltage converter arrangement, wherein the controller, in operation, causes the fuel cell unit to be operated at a plurality of operating points including at least a first operating point and a second operating point by communicating with the fuel cell unit via at least one of the first pair of connectors on the input side of the voltage converter arrangement, wherein the controller, in operation, specifies a resultant alternating current (AC) voltage as a reference variable, wherein the resultant AC voltage varies over time between a first voltage corresponding to the first operating point and a second voltage corresponding to the second operating point, wherein the first operating point and the second operating point are selected around a reference operating point corresponding to a third voltage, wherein the first voltage, the second voltage, and the third voltage lie within a linear range of a characteristic voltage versus current curve of the fuel cell unit, wherein the controller, in operation, adjusts the reference variable based on a comparison of the reference variable and a voltage supplied by the fuel cell unit via at least one of the first pair of connectors on the input side of the voltage converter arrangement, wherein the controller, in operation, performs an impedance operation while causing the fuel cell unit to be operated at the operating points, and wherein, during the impedance operation, at least one of the second pair of connectors on the output side of the voltage converter arrangement outputs a direct current (DC) voltage.

3. A method for operating a voltage converter arrangement which electrically couples a fuel cell unit connected on an input side of the voltage converter arrangement to a traction network including a battery connected on an output side of the voltage converter arrangement, wherein the voltage converter arrangement includes a first pair of connectors on the input side of the voltage converter arrangement, a second pair of connectors on the output side of the voltage converter arrangement, and a controller that causes the fuel cell unit to be operated at a plurality of operating points including at least a first operating point and a second operating point by communicating with the fuel cell unit via at least one of the first pair of connectors on the input side of the voltage converter arrangement, the first operating point and the second operating point being selected around a reference operating point, the method comprising:

specifying a resultant alternating current (AC) voltage as a reference variable, wherein the resultant AC voltage varies over time between a first voltage corresponding to the first operating point and a second voltage corresponding to the second operating point, wherein the first voltage corresponding to the first operating point, the second voltage corresponding to the second operating point, and a third voltage corresponding to the reference operating point lie within a linear range of a characteristic voltage versus current curve of the fuel cell unit;

adjusting the reference variable based on a comparison of the reference variable and a voltage supplied by the fuel cell unit via at least one of the first pair of connectors on the input side of the voltage converter arrangement;

performing an impedance operation while causing the fuel cell unit to be operated at the operating points; and during the impedance operation, outputting a direct current (DC) voltage at least one of the second pair of connectors on the output side of the voltage converter arrangement.

4. The method of claim 3, wherein the first voltage corresponding to the first operating point and the second voltage corresponding to the second operating point do not deviate more than ten percent from the third voltage corresponding to the reference operating point.

5. The voltage converter arrangement according to claim 1, wherein the first voltage corresponding to the first operating point and the second voltage corresponding to the second operating point do not deviate more than ten percent from the third voltage corresponding to the reference operating point.

6. The fuel cell system according to claim 2, wherein the first voltage corresponding to the first operating point and the second voltage corresponding to the second operating point do not deviate more than ten percent from the third voltage corresponding to the reference operating point.

* * * * *